(12) United States Patent
Duff et al.

(10) Patent No.: US 6,694,233 B1
(45) Date of Patent: Feb. 17, 2004

(54) SYSTEM FOR RELATIVE VEHICLE NAVIGATION

(75) Inventors: Elliot Stanley Duff, Queensland (AU); Jonathan Michael Roberts, Queensland (AU); Peter Ian Corke, Queensland (AU); Jock Bernard Cunningham, Queensland (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 0 days.

(21) Appl. No.: 10/031,775

(22) PCT Filed: Jul. 24, 2000

(86) PCT No.: PCT/AU00/00882
§ 371 (c)(1),
(2), (4) Date: Jun. 3, 2002

(87) PCT Pub. No.: WO01/07976
PCT Pub. Date: Feb. 1, 2001

(30) Foreign Application Priority Data

Jul. 23, 1999 (AU) .............................. PQ 1816

(51) Int. Cl.⁷ .............................. G06F 17/00
(52) U.S. Cl. ...................... 701/23; 701/200; 73/178 R; 340/988
(58) Field of Search ............... 701/23, 25, 200, 701/202, 205, 207, 217; 73/178 R; 340/988

(56) References Cited

U.S. PATENT DOCUMENTS

| | | | | |
|---|---|---|---|---|
| 5,172,315 A | * | 12/1992 | Asanuma et al. | 701/28 |
| 5,172,317 A | * | 12/1992 | Asanuma et al. | 701/28 |
| 5,448,487 A | * | 9/1995 | Arai | 701/28 |
| 5,640,323 A | * | 6/1997 | Kleimenhagen et al. | 701/1 |
| 5,928,309 A | * | 7/1999 | Korver et al. | 701/214 |
| 5,956,250 A | * | 9/1999 | Gudat et al. | 701/26 |
| 5,999,865 A | * | 12/1999 | Bloomquist et al. | 701/25 |
| 6,411,898 B2 | * | 6/2002 | Ishida et al. | 701/211 |

* cited by examiner

Primary Examiner—William A. Cuchlinski, Jr.
Assistant Examiner—Olga Hernandez
(74) Attorney, Agent, or Firm—Akin Gump Strauss Hauer & Feld LLC

(57) ABSTRACT

A navigation system for navigating an autonomous vehicle along a path that is confined by walls that are within range of on-board sensors is described. The system determines the relative location and orientation of the walls with respect to the vehicle. The system controls the steering angle and the ground speed of the vehicle by employing: (a) range data to establish free space in front of vehicle; (b) active contours to generate a desired path; (c) driving hints to guide the active contours along arcs and open areas; (d) steering hints to confine the active contours to a specific domain of free space, at, for instance, intersections; and (e) a desired path to generate steering demand or velocity.

13 Claims, 5 Drawing Sheets

Vehicle Control with Absolute Navigation System (ANS).

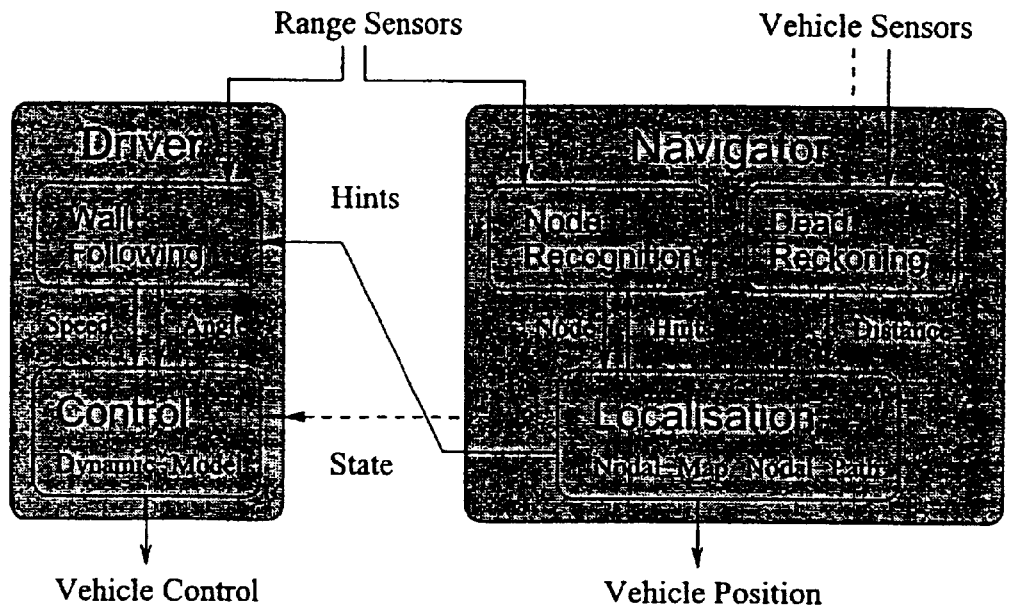
Figure 1: Block Structure of relative vehicle navigation system.
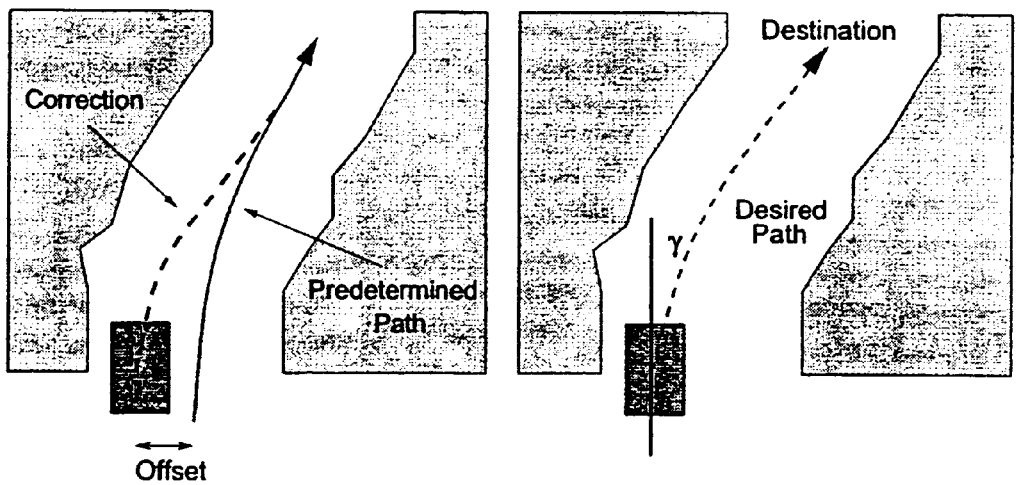
Figure 2: Absolute (a) and Relative (b) navigation.
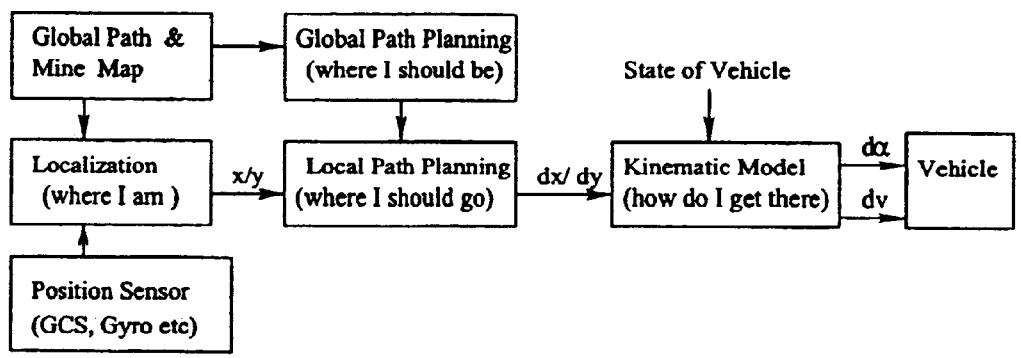
Figure 3: Vehicle Control with Absolute Navigation System (ANS).

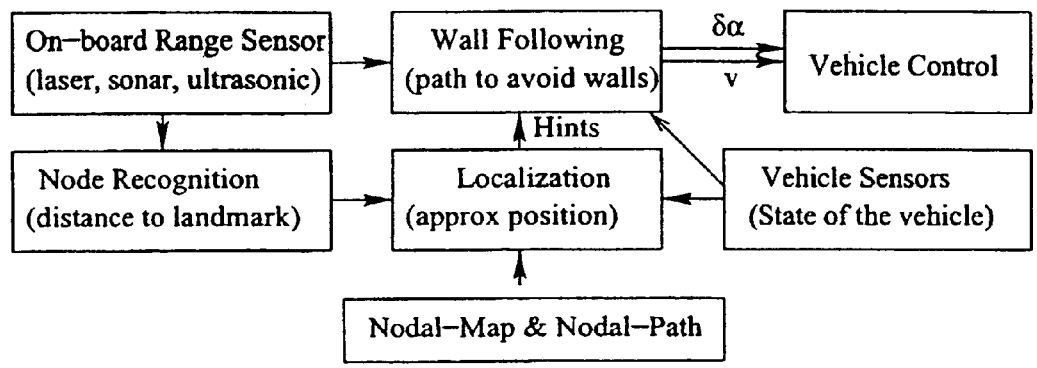
Figure 4: Vehicle Control with Relative Navigation System (RNS).
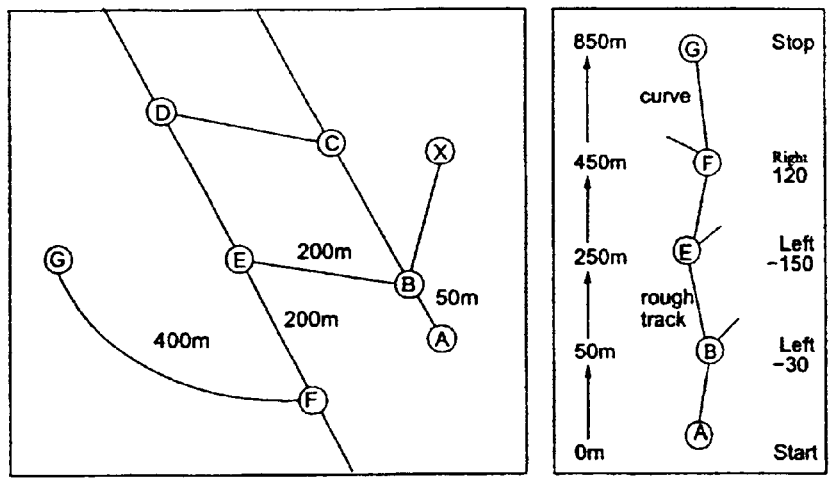
Figure 5: An example of Nodal-Map and Nodal-Path from A to G.
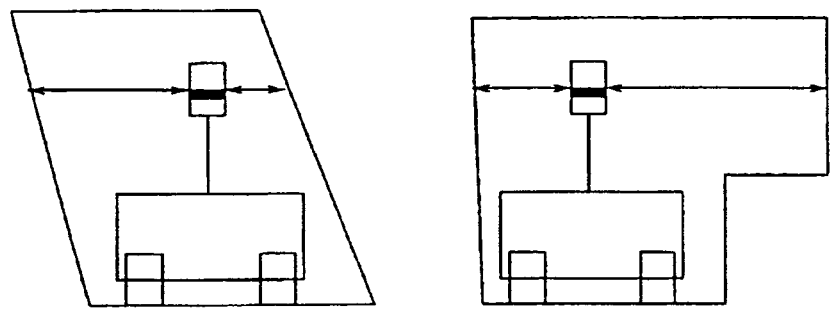
Figure 6: Possible tunnel geometries, in which mid-line following is inappropriate.

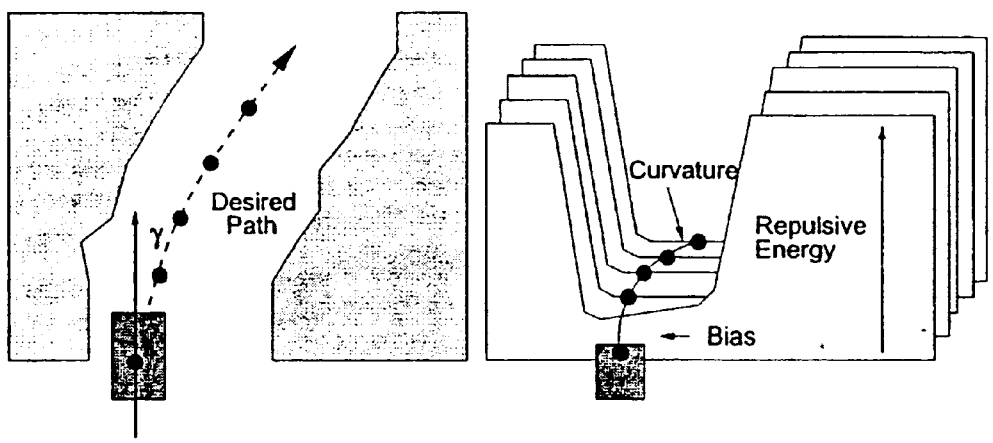
Figure 7: Wall following with snakes.
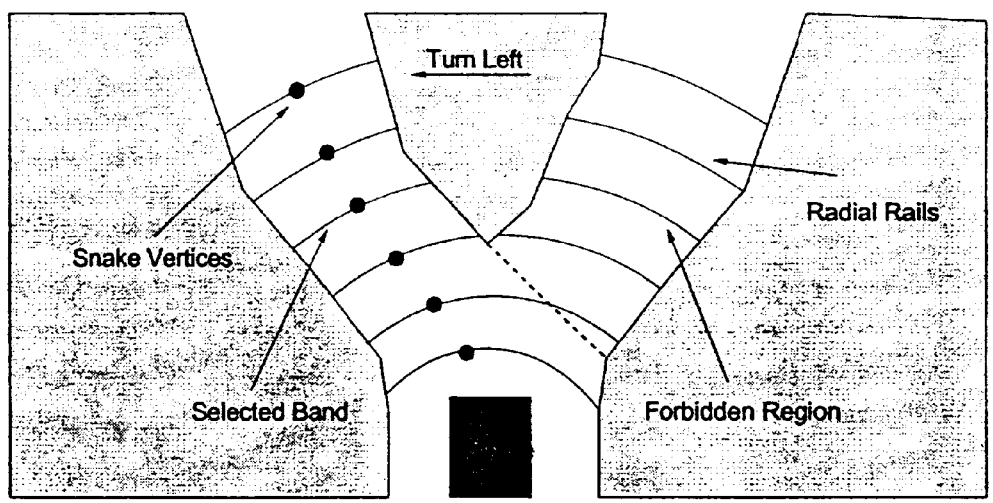
Figure 8: Turning with snakes.
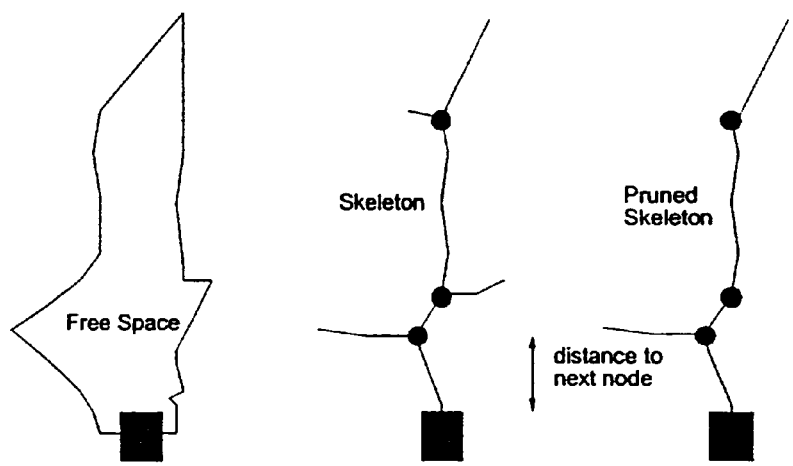
Figure 9: Skeletonization of free space in front of vehicle.

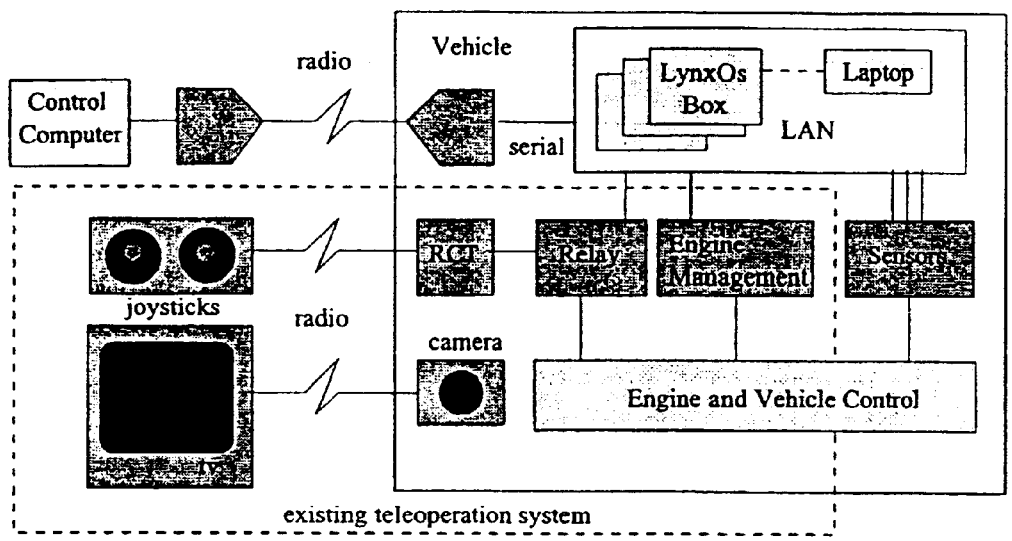
Figure 10: Block diagram of hardware required to automate vehicle.
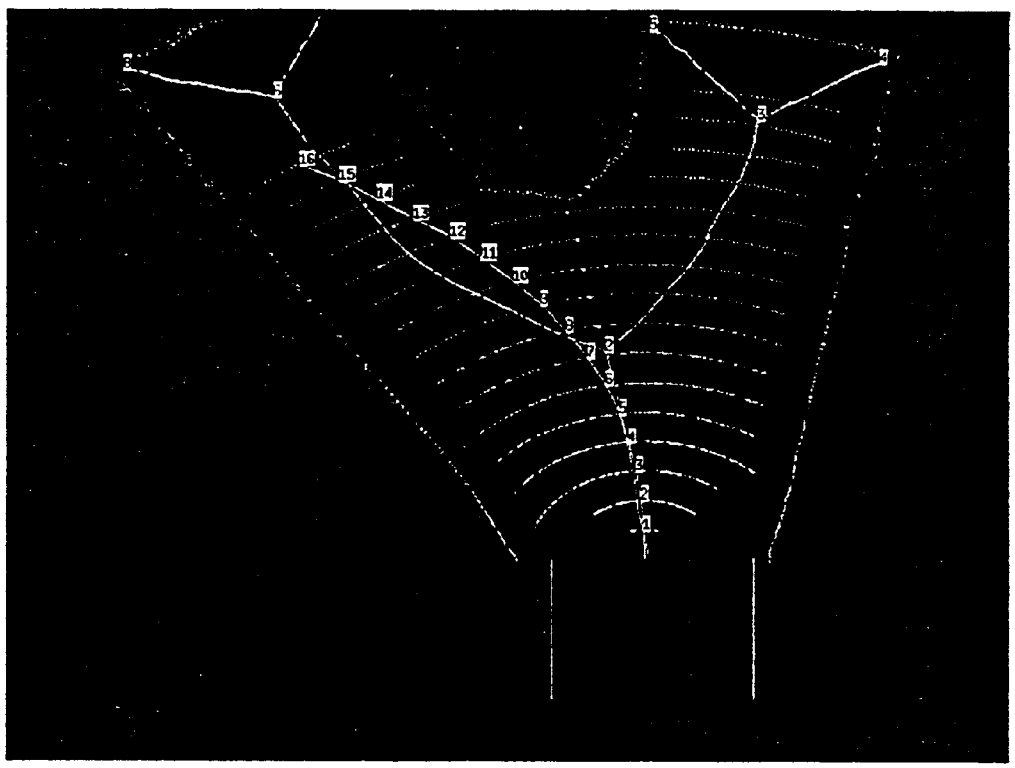
Figure 11: Graphical user interface, showing skeleton and snake at Y-junction.

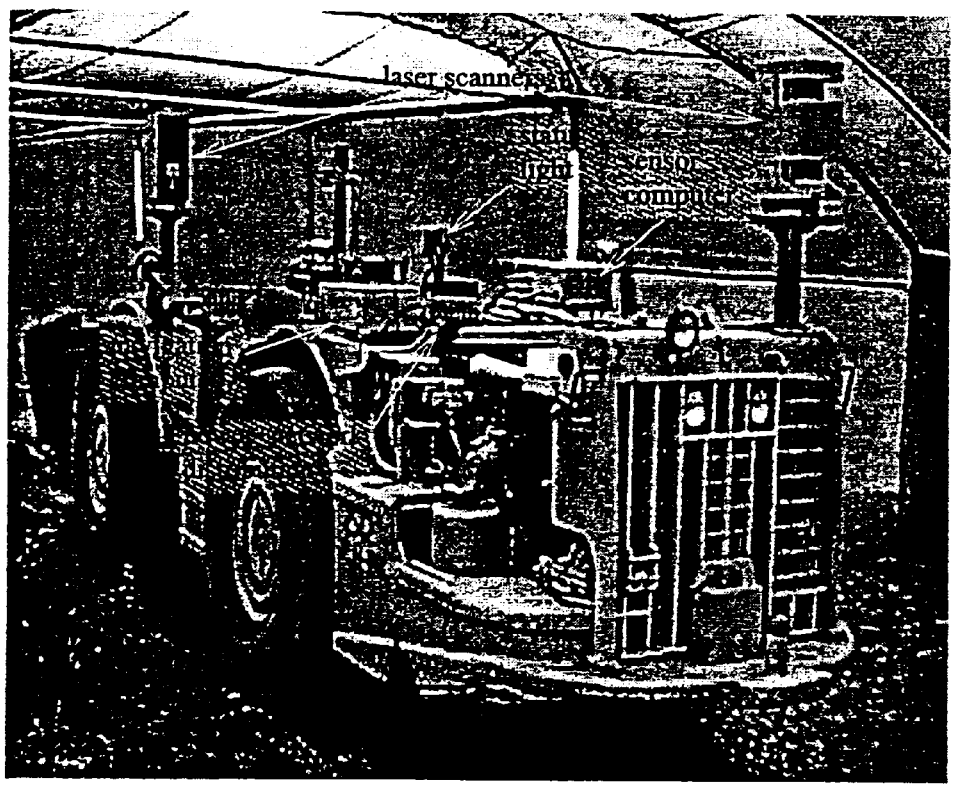
Figure 12: Side view of LHD, showing laser sensors.
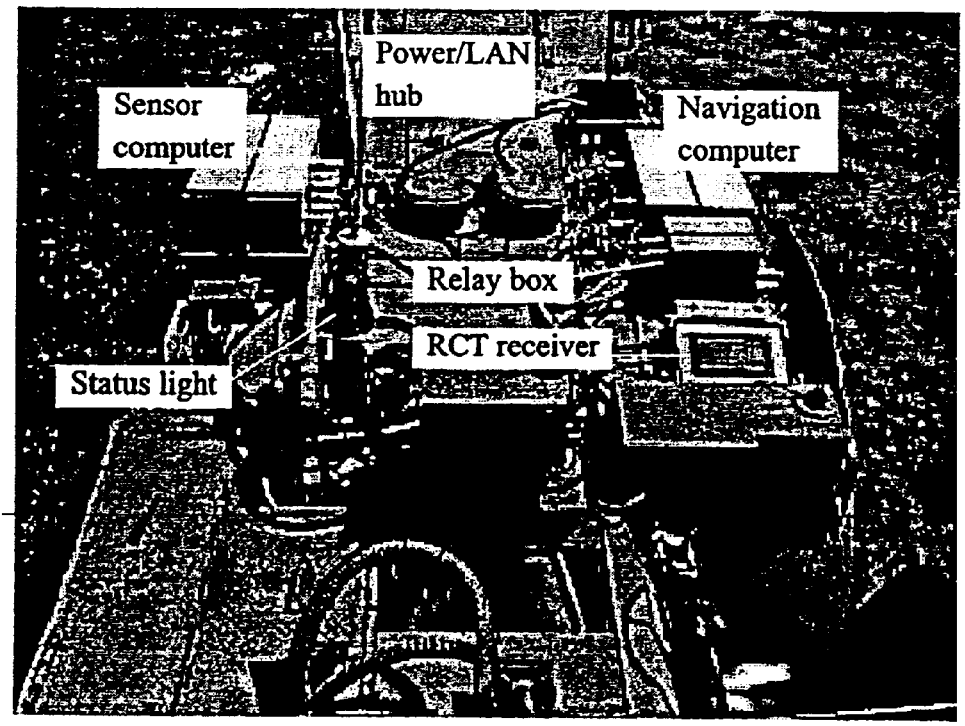
Figure 13: Overhead view of LHD, showing computer boxes.

SYSTEM FOR RELATIVE VEHICLE NAVIGATION

FIELD OF THE INVENTION

This invention relates to a system for relative vehicle navigation, and particularly relates to such a system for use in underground passageways or tunnels, for instance, an underground mine, and to control the movement of vehicles.

The invention will be described with reference to remotely operated mining vehicles in an underground mine, but it should be appreciated that the invention need not be limited to this embodiment.

BACKGROUND ART

The underground mining environment is unstructured in a robotic sense but is topologically highly structured. It consists of well-defined paths (tunnels with walls), intersections, muck piles and ore passes.

The navigation of a vehicle in such an environment can be compared to the task of rally driving, where the navigation of the vehicle is shared between driver and navigator. The driver is concerned simply with moving the vehicle forward and staying on the road, whilst the navigator uses pace notes to sequence his/her attention for landmarks, and provide instructions to the driver about the path to take at intersections.

In order to drive successfully, there is no need for precise absolute location data. The only time the location of the vehicle is needed is at intersections where a decision must be made. Fortunately, the very nature of these intersections make them easy to identify (coupled with odometry data and expectations from the map) and it is possible to reliably determine the position of the vehicle with respect to the intersection geometry.

The advantage to this approach is that it is very tolerant to: changes within the environment; machine performance, i.e. changes to tires and weight; and imprecise initialisation and map building. The interaction between the driver and navigator is shown in FIG. 1.

Traditional navigation systems are based upon an absolute frame of reference where the position of the vehicle is defined in terms of the distance with respect to an external frame of reference. This system will be referred to as the Absolute Navigation System (ANS).

In many situations, where the path of the vehicle is constrained by a wall, a far more suitable approach is a navigation system based upon a relative frame of reference. This system will be referred to as the Relative Navigation System (RNS). FIG. 2 illustrates the main difference between the ANS and the RNS.

In the ANS there is a predetermined path, in terms of the external coordinate system, for the vehicle to follow. If the vehicle strays from the path (by some offset) then a local path correction is applied to the vehicle. In the RNS, there is no predefined path, only some distant destination. The desired path of the vehicle is a local path that is generated to keep the vehicle from hitting the walls. Although these systems may generate a similar "vehicle path" the control systems used to generate these paths are quite different.

FIG. 3 illustrates vehicle control using the ANS. This system requires a map and a global-path. The map contains the position of landmarks used to help establish the location of the vehicle. Localisation is achieved by comparing the landmarks in the mine-map with data from position sensors (e.g. the position of reflective beacons) and fusing this information with dead reckoning. The position sensors can be reflective beacons which need to be placed at known positions in the mine. The global-path is a set of points, with respect to the external coordinate frame, that define a predetermined path through the mine. Local path planning is achieved by comparing where we are (x,y) with where we should be (x',y'). This tells us where we want to go. The correction (dx,dy) is fed into a kinematic model, which is coupled with the state of the vehicle (velocity, acceleration) to estimate a change in heading (dα) and speed (dv).

The ANS is effectively blind—the control of the vehicle is inferred from the position of the vehicle, rather than what the sensors tell it about the environment. If there is any error in the localisation then it is quite possible for the vehicle to collide with a wall.

It is an object of the present invention to provide a means to guide a vehicle in an underground environment which does not rely upon an ANS.

In one form, the invention resides in a means of navigating (IEEE Dictionary: "The process of driving a vehicle so as to reach the intended destination"), without localisation infrastructure (this refers to infrastructure that is added to the external environment to help localise the vehicle; it can include active and passive beacons) or external control, an autonomous vehicle along a path that is confined by walls (the wall does not need to be real; it can be conceptual—it is simply a boundary between where the vehicle can and cannot go) that are within range of on-board sensors by determining the relative location and orientation of the walls with respect to the vehicle, the means comprising:

Means of controlling the vehicle (setting steer angle and ground speed) without localisation comprising hardware and means to:
  (a) use range data to establish free space in front of vehicle,
  (b) use active contours (or snakes) to generate a desired path,
  (c) use driving hints to guide the or a said snake, for instance along arcs and open areas, and/or to
  (d) use steering hints to confine the snake to a specific domain of free space, for instance at intersections, and
  (e) use desired path to generate steering demand and velocity.

In a broad form, the invention resides in a method for navigating a vehicle, the method comprising creating active contours (or snakes) to generate a desired path for the vehicle, using driving hints to guide the or a said snake and/or using steering hints to confine the snake to a specific domain of free space.

The range data may be generated from on-board sensors which emit and receive electro-magnetic/ultra-sonic radiation to determine the range and bearing of walls.

The active contours to generate the desired path may be such that:
  i. the desired path must avoid walls and preferably minimise curvature.
  ii. the length and stiffness of the snake is a function of the vehicle and its state.
  iii. the "energy" of the snake is a defined function of the proximity to walls and its curvature.
  iv. if the "energy" exceeds a predefined limit, the velocity of vehicle is reduced and if the "energy" continues to exceed the limit for predetermined time/distance the vehicle is stopped.

The driving hints to guide the snake along arcs and open areas may:
  i. modify speed according to local curvature and recommended speed limits.
  ii. add a "potential gradient energy" term to bias the position of the snake (i.e. keep left).

The steering hints to guide the snake may be such that:
  i. radial rails are generated in front of the vehicle,
  ii. the rails are segmented into bands by the topology of the free space,
  iii. appropriate bands are selected by steering hints, and
  iv. snake vertices are fitted to selected bands.

The desired path to generate steering demand and velocity may compare radius of curvature of vehicle, with radius of curvature of path.

In another form, the invention resides in a means of localising the vehicle without localisation infrastructure comprising:
  (a) a means of establishing the or a starting position,
  (b) using dead-reckoning (ground speed, INS etc) to estimate the vehicle position,
  (c) using range data to find topology of free space in front of vehicle,
  (d) identifying changes in topology as landmarks (nodes),
  (e) matching said nodes to nodal-map to update vehicle position,
  (f) using knowledge of position and nodal-map to pass driving hints to vehicle control,
  (g) using knowledge of position and nodal-path to pass steering hints to vehicle control.

The dead-reckoning may be such that:
  i. vehicle position is defined as the approximate distance to the next node.
  ii. vehicle position is reset once a node has been passed.

The range data to find topology of free space in front of vehicle may be such to:
  i. offset and re-scale data to front centre of vehicle.
  ii. smooth and re-sample range data.
  iii. generate contour of equally spaced points.

The identification of changes in topology as landmarks (nodes) may comprise:
  i. skeletonising free space.
  ii. pruning branches that are insignificant.
  iii. label remaining intersections as nodes.

The matching of these nodes to nodal-map to update vehicle position may comprise:
  i. ignoring nodes that are not expected (from nodal-map and position).
  ii. matching based upon minimum radius, energy, and connectivity.

The use of knowledge of position and nodal-map to pass driving hints to vehicle control may include, max-speed, gradient, curvature and wall profile.

The use of knowledge of position and nodal-path to pass steering hints to vehicle control may include:
  i. the nodal-path containing a list of nodes that the vehicle must pass through; and
  ii. the steering hints consisting of turn-left, turn-right, stop, etc.

In another form, the invention resides in the creation of a nodal-map that contains:
  (a) position of landmarks (topological nodes, intersections).
  (b) topological relationship between nodes (distance, curvature, etc).
  (c) the nature of the arc that connects the nodes (driving hints).
  (d) a means where a nodal-map of the intended path and features is determined by driving the vehicle along the intended path, logging and processing the data obtained from all or any of the aforementioned sensors and storing the nodal-map along with the identifying characteristics of the nodes in memory.

The nature of the arc that connects the nodes may be such to:
  i. account for physical limitations (i.e. gradient).
  ii. to improve the performance of the vehicle.
  iii. to account for unusual/dangerous conditions, i.e. wall-profile.
  iv. such hints will depend on the direction of travel.

The means where a nodal-map of the intended path and features is determined by driving the vehicle along the intended path, logging and processing the data obtained from all or any of the aforementioned sensors and storing the nodal-map along with the identifying characteristics of the nodes in memory may comprise:
  i. A means where the dead-reckoning method is used to estimate the relative position of the nodes along the intended track in either the forward or reverse direction with respect to the vehicle.
  ii. A means where the range finding data is used generate a representation of the tunnel walls in the mine.

BRIEF DESCRIPTION OF THE DRAWINGS

Various parts of the invention will be described with reference to the following drawings in which:

FIG. 1 illustrates a block structure of relative vehicle navigation system.

FIG. 2 illustrates absolute and relative navigation.

FIG. 3 illustrates vehicle control with absolute navigation system.

FIG. 4 illustrates vehicle control with relative navigation system.

FIG. 5 illustrates an example of a nodal-map and nodal-path.

FIG. 6 illustrates possible tunnel geometries in which mid-line following is inappropriate.

FIG. 7 illustrates wall following with snakes.

FIG. 8 illustrates turning with snakes.

FIG. 9 illustrates skeletonisation of free space in front of a vehicle.

FIG. 10 illustrates a block diagram of the hardware required to automate a vehicle.

FIG. 11 illustrates graphical user interface, showing skeleton and snake at a Y junction.

FIG. 12 illustrates a side view of a LHD, showing laser sensors.

FIG. 13 illustrates an overhead view of a LHD, showing computer boxes.

BEST MODE

Vehicle control under RNS (see FIG. 4) requires a nodal-map and a nodal-path (see FIG. 5). Although the nodal-map is similar to the mine-map of the ANS, in that it contains information about the position of landmarks in the mine, it also contains information about the relative topology between the landmarks and driving hints. The position of these landmarks need only be approximate. For this reason they are referred to as nodes, and the network of nodes is referred to as a nodal-map. The nodal-path of the vehicle is then defined as a list of nodes that the vehicle must pass through. The vehicle is controlled by making changes to the heading and velocity to prevent the vehicle from hitting the walls. The walls are seen by on-board sensors. The absolute position of the vehicle is not critical to such control, only the relative position of the vehicle with respect to the walls. The global position of the vehicle is estimated from dead-reckoning and node recognition. This knowledge is used to influence the behaviour of the vehicle control through hints (i.e. driving and turning strategies).

With RNS, the vehicle is controlled by the actual free space in front of the vehicle. In this situation, the vehicle can move without any knowledge of the vehicle's global position. Although such knowledge may be redundant, it is not irrelevant. Without such knowledge, the vehicle may not choose the appropriate path at an intersection. Furthermore, knowledge of the vehicle's position allows the vehicle to operate at speeds higher (or lower) than the free-space would recommend (i.e. on long curves, or bumpy terrain).

This split between control and localisation, highlights one of the main differences between ANS and RNS. In the ANS, vehicle control can only be achieved after the vehicle's absolute location has been established. The two routines are tied together; they are synchronous. The vehicle cannot be controlled if there is a problem with localisation. In many situations, the task of localisation can be very difficult. It can be computationally expensive (time consuming) and to make it robust, requires an excessive amount of redundant information. To improve the reliability of finding landmarks, infrastructure is added to the environment (e.g. reflecting beacons).

In RNS, where the vehicle control and localisation have been "de-coupled", the vehicle control can run independently, and at a much higher bandwidth than the localisation. This is a desirable feature for autonomous vehicles. In practice, vehicle control is performed at a high bandwidth and is seen as a low-level process, whilst the localisation is the high-level process that can be performed at a much lower bandwidth.

Since localisation is not critical to vehicle control, its reliability and robustness is less important. Thus, it may not be necessary to use any localisation infrastructure. In fact, it is possible to use natural features, such as intersection or corners, as landmarks. In particular, the features of free space topology in front of the vehicle are excellent landmarks. Of course, since the RNS relies on the existence of walls to control the vehicle, it cannot "navigate" open space.

In an embodiment, the nodal-map is a mathematical graph comprising nodes and branches (see left FIG. 5). The nodal-path can be defined as a list of nodes that the vehicle must pass through (see right FIG. 5). For example, and referring to FIG. 5, consider the plan to travel from Node A to Node G, via Nodes B, E and F. To navigate this path it is necessary to make decisions only at points B, E and F. In a computer implementation it would comprise multi-linked data-structures. The data-structures representing branches and nodes would be cross-linked. A hash table would be used to map textual node and branch names to the data-structure.

The nodal-map can be constructed from a physical map of the mine, or it could be constructed by driving the vehicle along the intended path, logging and processing the data from the on-board sensors. Each node contains links and angles to connecting branches, whilst each branch segment contains: the length of the branch, links to both head and tail node and driving hints.

These hints can include: a recommended maximum speed, curvature, gradient, and wall following strategies. These strategies are needed to deal with unusual tunnel profiles, such as those shown in FIG. 6. The strategies might include: follow-left-wall, follow-right-wall, follow-centreline, etc. Curvature may be useful as a feed-forward signal for steering. The hints may also assist in segmentation/interpretation of the external sensor data (i.e. node recognition).

The task of the Driver module (left-hand side of FIG. 1) is to control the vehicle, to move it forward through the mine without hitting the walls and avoiding obstacles. The Driver module requires no knowledge of the location of the vehicle with respect to a global co-ordinate frame. The control module is given two demands from the Wall-Following module: speed (v) and steering angle (a). A dynamic model of the vehicle and the current vehicle state is required to convert this demand to vehicle control.

The task of the Wall-Following module (see FIG. 1) is to generate a steering angle (a) to prevent the vehicle from hitting the wall with respect to the immediate walls within the mine. An analogy is a guided bus-way, where instead of rubber wheels on the side of the bus, a laser beam keeps the vehicle on track.

In an embodiment a desired vehicle path needs to be constructed. This can be done with active contours (called snakes). A snake is a set of points (vertebra) that define a line, or spline (see FIG. 7). The position of each vertebra is iteratively determined by minimising the energy of the snake. The snake has three energy terms: external, internal and potential. In this case, the external energy manifests itself as a repulsive force between the nodes of the snake and the wall. The internal energy manifests itself as a function of the curvature of the snake. The total length of the snake is a function of the speed of the vehicle, and its stiffness a function of the maximum turning circle of the vehicle. A potential energy function is added to account for hints supplied from the navigator (i.e. keep-left). To control turning, the snake can be excluded from regions of space (see FIG. 8). This is done with hints from the navigator (i.e. turn left).

It is important to note that there is no offset in this representation. This differs from ANS because the desired vehicle path is generated relative to the current position of the vehicle. This occurs because the "tail" of the snake is fixed to the current position of the vehicle. This technique has an added side effect, in that the energy of the snake is related in some manner to the difficulty of the path (i.e. either high curvature, or high external energy where the walls are very close). In either case, this energy can be used by the driver to slow the vehicle down. In fact, the possibility of collision can be monitored by keeping a record of the snake energy.

In practice, if snakes are not well constrained they can become unstable. To improve the stability and robustness of the snake algorithm, the preferred embodiment of this routine is with fixed radial rails. In this method, each vertebra of the snake is placed on a different "rail" that is a fixed distance from the front of the vehicle (i.e. 1 m to 15 m). Each vertebra is then free to move to the left or right, along the rail. Furthermore, given what is known about the free space in front of the vehicle it is possible to generate bands, which define the upper-bound and lower-bound position of the vertebra. Thus, given hints from the navigator, it is possible to select a band for turning (i.e. left band, right band).

The task of the Navigator module (see right-hand side of FIG. 1) is to supply the Wall-Following module with instructions and hints based upon a nodal-path. To do this, the navigator must be able to estimate the position of the vehicle (Localization module). In the nodal representation, the position of the vehicle is described by the name of the current branch, and the distance to the next node. It can be estimated from:

1. Dead-reckoning—determining the position of the vehicle with respect to its position at a different time by the application of vectors representing course and distance.
2. Node recognition—being able to recognise the identity of a node (landmark) from external features in front of the vehicle—thus giving an estimate of the distance to the node.

The task of node recognition is made simpler by the fact that:

1. The nodes occur in a known sequence (e.g. A then B, then E and so on).
2. The vehicle has an expectation of the next node to be encountered.
3. The fact that decisions need to be made at these points implies that the geometry at these points is sufficiently rich to be identified from external sensor data (although it could be identified by some active or passive tag).

For example, if a T-junction were expected then the node recognition software would be "looking" for a decrease in the free path distance ahead of the vehicle. If a left-hand branch were expected, the node recognition software would be "looking" for laser reflections from points to the left of the currently estimated left-hand wall. Once the vehicle has identified a node and is confident of the precise datum point (based upon laser and measured features) and the vehicle position with respect to the datum, then the odometry can be reset ready for the next branch. Once the left turn has been made, a new branch is selected and the node recognition software algorithm starts looking for the next node.

The identification of nodes (landmarks) based upon range data can be confused by noise and changes in orientation. To improve the robustness of this identification, the preferred embodiment of this routine is with a skeletonisation algorithm. This is a classical image processing algorithm that reduces a two dimensional shape into a curve with the same homotopy (see FIG. 9). The skeleton is a powerful shape factor for feature recognition because it contains both topological and metric information. The topological values include the number of end points and the number of nodes where branches meet. The metric values are the mean length of branches and the angles of the branches. This closely duplicates the features in the nodal-map. One of the best features for recognition is the node radius—the distance from the node to the nearest wall. It has been found that end-nodes can be safely pruned if their radius overlaps their parent node.

One method of implementation of the system according to the invention is to install it with an existing tele-operated vehicle control system. A typical tele-operation system requires a human operator to control the vehicle from a remote location via a conventional radio remote control system. Video images from vehicle-mounted cameras are used by the operator to guide the vehicle.

The operator can control all of the necessary vehicle functions using joysticks and associated switches. The control commands are transmitted from a radio transmitter to the vehicle mounted receiver (see FIG. 10). In this configuration, the control of the vehicle can be switched between the teleoperation (default) and automation. This implementation has a number of advantages:

1. There is only one point of control.
2. All hardware necessary to control the vehicle already exists.
3. The safety systems build into the tele-op systems can be used.
4. The vehicle can be switched back into tele-op mode.

This last point is very useful during development. It means that the vehicle can be controlled remotely for operations that have not been automated (i.e. digging), and the vehicle can be recovered if the automation system fails. In this approach, an automated system works by duplicating the commands that would normally be sent by a human operator. This can be done in two ways:

1. off-board: duplicate the radio commands from the joystick,
2. on-board: by-pass the radio receiver and communicate with the tele-op transducers and actuators (e.g. solenoid valves).

Automation is achieved by examining the data from sensors, whether it be images from a TV camera or range data from laser scanners. To be able to perform automation off-board it is necessary for all of this sensor data to be transmitted over RF (Radio Frequency). Unfortunately, the underground environment is very poor environment for RF, and thus, the bandwidth for such information is very low. Since, a great deal of data is needed to navigate a vehicle at high speed, one solution is to place the automation system on-board.

For the vehicle to be completely autonomous, all of the software and hardware necessary for navigation must reside on the vehicle itself. Of course, for control and safety reasons, a critical link in the control of the vehicle must be an external agent. In this case, it could be any type of computer (PC or laptop) that has radio contact with the vehicle (e.g. via radio modem). To improve the safety of such a system, whenever contact with this external agent is broken, software on the vehicle will bring the vehicle to a halt. Additionally, if radio contact for the teleoperation control system is lost, the vehicle will also be brought to a stop. The software and hardware elements in this control loop are implemented in a "fail-safe" configuration.

Currently, calculations necessary for navigation are performed by two 200 MHz Pentium processors (On Teknor VIPer821 half size PC/AT cards) connected to each other via an Ethernet LAN (Local Area Network). To achieve real-time performance the software can be installed on a real-time multi-tasking operating system called LynxOS (posix compliant). The software has been written in ANSI C. To improve the flexibility of the system, the software has been decoupled into separate modules that communicate via RPC (remote procedure calls). Since RPC's can be made across the LAN, if more processing power is required, one or more of the software modules can be moved onto any number of processors.

To help the development of the automation system each module has an associated RPC server, which can connect to a Tcl/Tk client (Tcl/Tk is a simple scripting graphics language). This client can be run on any laptop with an operating system that supports Tcl/Tk. An example of the graphical user interface (GUI) used to display the snake and skeleton is shown in FIG. 11, where the vehicle is shown in the lower right corner, and the dark area represents the free space in front of the vehicle. Radial rails are generated in this free space at 1 m intervals. Two paths are identified (left and right) with the skeletonisation of free space. The left-hand path is selected and the snake is restricted to the left-hand bands of the top four rails (13 to 16). The arc that is labelled with numbers represents the position of the snake that has the minimum energy (curvature and repulsive force from walls). Although, the wall bias is not used in this example, it may have been useful to shift the path to the left, to "hug" the left wall.

A side view of the LHD is shown in FIG. 12, showing the position of the Erwin SICK PLS's (Scanning Range Laser) front and rear. They have a range of 50 m, with 0.5 degree angular resolution and a scanning angle of 180 degrees at 25 Hz. Communication with the CPU's is over a serial interface running at 500 kbaud via a dedicated 68360 processor. In a production model these lasers would be lowered into protective boxes. An overhead view of the LHD is shown in FIG. 13, showing the position of the two computers, and assorted power supplies etc. In a production model, most of these components can be packed into a single box.

It should be appreciated that various changes and modifications can be made to the embodiments described without departing from the spirit and scope of the invention.

What is claimed is:

1. A means of localizing a vehicle without localization infrastructure comprising:
   (a) a means of establishing a starting position,
   (b) using dead-reckoning to estimate the vehicle position, wherein the dead reckoning is such that:
      (1) the vehicle position is defined as a distance to a next landmark,
      (2) the vehicle position is reset once the next landmark has been passed,
   (c) using range data to find topology of free space in front of the vehicle,
   (d) identifying changes in the topology as the next landmark,
   (e) matching said next landmark to a nodal-map to update the vehicle position,
   (f) using knowledge of position and the nodal-map to pass driving hints to vehicle control, and
   (g) using knowledge of the position and the nodal-path to pass steering hints to the vehicle control.

2. The means of claim 1, wherein the range data to find the topology of free space in front of the vehicle is such to:
   (a) offset and re-scale data to front centre of vehicle,
   (b) smooth and resample the range data,
   (c) generate a contour of equally spaced points.

3. The means of claim 2, wherein the identification of changes in topology as landmarks comprises:
   (a) skeletonizing free space,
   (b) pruning branches that are insignificant,
   (c) label remaining intersections as landmarks.

4. The means of claim 3, wherein the matching of the landmarks to the nodal-map to update the vehicle position comprises:
   (a) ignoring the landmarks that are not expected (from nodal-map & position), and
   (b) matching based upon minimum radius, energy, and connectivity.

5. The means of claim 4, wherein the use of knowledge of the position and the nodal-map to pass driving hints to the vehicle control includes, max-speed, gradient, curvature and wall profile.

6. The means of claim 5, wherein the use of knowledge of the position and a nodal-path to pass steering hints to vehicle control includes:
   (a) the nodal-path containing a list of the landmarks that the vehicle must pass through; and
   (b) the steering hints of including turn-left, turn-right, and stop.

7. A means of navigating without localization infrastructure or external control, an autonomous vehicle along a path that is confined by walls that are within range of on-board sensors by determining the relative location and orientation of the walls with respect to the vehicle, the means comprising means of controlling the vehicle, including setting steer angle and ground speed, without localization comprising hardware and means to:
   (a) use range data to establish free space in front of vehicle,
   (b) use active contours to generate a desired path,
   (c) use driving hints to guide said active contours, for instance along arcs and open areas, and/or to
   (d) use steering hints to confine the snake active contours to a specific domain of free space, for instance at intersections, and
   (e) use the desired path to generate steering demand and velocity, wherein the active contours to generate the desired path are such that:
      (1) the desired path must avoid walls and preferably minimize curvature,
      (2) the length and stiffness of the active contour is a function of the vehicle and the state of the vehicle:
      (3) the "energy" of the active contours is a defined function of the proximity to the walls and the curvature of the active contours, and
      (4) if the "energy" exceeds a predefined limit, the velocity of the vehicle is reduced and if the "energy" continues to exceed the limit for a predetermined time/distance, the vehicle is stopped.

8. The means of claim 7, wherein the range data is in the form of on-board sensors which emit and receive electromagnetic/ultra-sonic radiation to determine the range and bearing of the walls.

9. The means of claim 7, wherein the driving hints to guide the active contours along the arcs and the open areas are adapted to:
   (a) modify the ground speed according to local curvature and recommended speed limits, and
   (b) add a "potential gradient energy" term to bias the position of the active contours snake.

10. The means of claim 7, wherein the steering hints to guide the active contours are such that:
    (a) radial rails are generated in front of the vehicle,
    (b) the rails are segmented into bands by the topology of the free space,
    (c) appropriate bands are selected by steering hints, and
    (d) points on the active contours are fitted to selected bands.

11. The means of claim 7, wherein the desired path to generate the steering demand, and the velocity compares a radius of curvature of the vehicle, with a radius of curvature of the path.

12. A nodal-map for use with means of localizing a vehicle without localization infrastructure, the nodal map comprising:

(a) a position of landmarks, (b) topological relationship between the landmarks, (c) the nature of an arc that connects the landmarks, wherein the nature of the arc that connects the landmarks is such to:
  (1) account for physical limitations,
  (2) improve the performance of the vehicle, and
  (3) account for unusual/dangerous conditions, and (d) a means where the nodal-map of an intended path and features is determined by driving the vehicle along the intended path, logging and processing data obtained from at least one sensor and storing the nodal-map along with identifying characteristics of the landmarks in a memory.

13. The nodal-map of claim 12, wherein the means where a nodal-map of the intended path and features is determined comprises:

(a) a means where the dead reckoning method is used to estimate the relative position of the landmarks along the intended track in either the forward or reverse direction with respect to the vehicle, and (b) a means where the range finding data is used generate a polyline.

* * * * *